(12) United States Patent
Brown et al.

(10) Patent No.: US 11,487,347 B1
(45) Date of Patent: Nov. 1, 2022

(54) ENHANCED MULTI-MODAL COMMUNICATION

(75) Inventors: Fred A. Brown, Colbert, WA (US); Charles C. Wooters, Annapolis, MD (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 12/614,493

(22) Filed: Nov. 9, 2009

Related U.S. Application Data

(60) Provisional application No. 61/112,937, filed on Nov. 10, 2008.

(51) Int. Cl.
| | |
|---|---|
| *G06F 3/01* | (2006.01) |
| *G06F 3/16* | (2006.01) |
| *H04L 67/10* | (2022.01) |
| *G10L 15/26* | (2006.01) |
| *G10L 15/00* | (2013.01) |
| *G10L 13/00* | (2006.01) |
| *G06Q 30/00* | (2012.01) |
| *G06Q 10/02* | (2012.01) |

(52) U.S. Cl.
CPC ............ *G06F 3/01* (2013.01); *G06F 3/16* (2013.01); *G10L 15/00* (2013.01); *G10L 15/26* (2013.01); *H04L 67/10* (2013.01); *G06Q 10/02* (2013.01); *G06Q 30/01* (2013.01); *G10L 13/00* (2013.01)

(58) Field of Classification Search
CPC ... H04M 3/493–4938; G10L 15/22–34; G10L 15/30; H04L 51/06–066; G06F 17/30861–30905; G06F 16/33–3329; G06F 40/00–58

USPC .............. 709/201–207, 201–203, 217–219; 704/257, 275; 715/700–866
See application file for complete search history.

(56) References Cited

U.S. PATENT DOCUMENTS

| | | | |
|---|---|---|---|
| 6,691,151 B1* | 2/2004 | Cheyer et al. ................ 709/202 |
| 6,745,163 B1* | 6/2004 | Brocious et al. ............. 704/260 |
| 6,816,578 B1* | 11/2004 | Kredo et al. ............... 379/88.17 |
| 6,859,451 B1* | 2/2005 | Pasternack et al. .......... 370/352 |
| 6,876,728 B2* | 4/2005 | Kredo et al. ............... 379/88.17 |
| 6,934,277 B1 | 8/2005 | Werve et al. |
| 6,957,077 B2* | 10/2005 | Dehlin .......................... 455/466 |
| 6,973,427 B2 | 12/2005 | Hwang et al. |
| 7,050,550 B2 | 5/2006 | Steinbiss et al. |
| 7,363,027 B2* | 4/2008 | Hon et al. .................. 455/414.1 |
| 7,376,897 B1* | 5/2008 | Mao ............................ 715/714 |
| 7,398,462 B1* | 7/2008 | Gjerstad et al. .............. 715/221 |

(Continued)

OTHER PUBLICATIONS

Wahlster, Wolfgang. "Smartkom: Fusion and fission of speech, gestures, and facial expressions." Proceedings of the 1st International Workshop on Man-Machine Symbiotic Systems. 2002.*

(Continued)

*Primary Examiner* — Glenton B Burgess
*Assistant Examiner* — Julian Chang
(74) *Attorney, Agent, or Firm* — Meunier Carlin & Curfman LLC

(57) ABSTRACT

Systems and methods for handling dual modality communication between at least one user device and at least one server. The modalities comprise audio modalities and mechanical motion modalities. The server may be simultaneously connected to the user device via a data network and a voice network and simultaneously receive audio-based input and mechanical motion-based input.

22 Claims, 4 Drawing Sheets

(56) References Cited

U.S. PATENT DOCUMENTS

| | | | |
|---|---|---|---|
| 7,490,125 B1* | 2/2009 | Jagadeesan | G06F 9/4443 |
| | | | 370/512 |
| 7,536,454 B2 | 5/2009 | Balasuriya | |
| 7,565,368 B2 | 7/2009 | Zartler et al. | |
| 7,603,705 B2 | 10/2009 | Roy | |
| 7,751,347 B2* | 7/2010 | Giroti | 370/260 |
| 7,813,485 B2* | 10/2010 | Yin et al. | 379/88.13 |
| 7,921,214 B2* | 4/2011 | Da Palma et al. | 709/227 |
| 8,224,308 B1* | 7/2012 | Gavrylyako | H04L 67/306 |
| | | | 455/405 |
| 8,677,377 B2 | 3/2014 | Cheyer et al. | |
| 8,788,269 B2* | 7/2014 | Stifelman | G06F 3/167 |
| | | | 704/270 |
| 2001/0049603 A1* | 12/2001 | Sravanapudi et al. | 704/270.1 |
| 2002/0165715 A1 | 11/2002 | Riis et al. | |
| 2002/0184029 A1* | 12/2002 | Brittan et al. | 704/260 |
| 2003/0002633 A1* | 1/2003 | Kredo et al. | 379/88.08 |
| 2003/0018700 A1* | 1/2003 | Giroti et al. | 709/201 |
| 2003/0126330 A1* | 7/2003 | Balasuriya | G06F 3/038 |
| | | | 710/107 |
| 2003/0167172 A1* | 9/2003 | Johnson et al. | 704/270.1 |
| 2003/0182125 A1* | 9/2003 | Phillips et al. | 704/270.1 |
| 2003/0225825 A1* | 12/2003 | Healey et al. | 709/203 |
| 2003/0229471 A1* | 12/2003 | Guralnik et al. | 702/182 |
| 2004/0104938 A1* | 6/2004 | Saraswat | H04M 1/72561 |
| | | | 715/764 |
| 2004/0143636 A1* | 7/2004 | Horvitz et al. | 709/207 |
| 2004/0146048 A1 | 7/2004 | Cotte | |
| 2004/0148419 A1* | 7/2004 | Chen et al. | 709/231 |
| 2004/0181467 A1* | 9/2004 | Raiyani et al. | 705/28 |
| 2005/0027538 A1* | 2/2005 | Halonen et al. | 704/275 |
| 2005/0059426 A1* | 3/2005 | Aarnio | H04L 51/38 |
| | | | 455/550.1 |
| 2005/0086382 A1* | 4/2005 | Ramaswamy et al. | 709/246 |
| 2005/0101300 A1* | 5/2005 | Hon et al. | 455/412.1 |
| 2005/0131911 A1* | 6/2005 | Chi | G06F 17/30905 |
| 2005/0136897 A1* | 6/2005 | Praveenkumar et al. | 455/414.1 |
| 2005/0149326 A1* | 7/2005 | Hogengout et al. | 704/242 |
| 2005/0165599 A1* | 7/2005 | Russell et al. | 704/7 |
| 2005/0171664 A1* | 8/2005 | Konig | 701/36 |
| 2005/0234722 A1* | 10/2005 | Robinson et al. | 704/257 |
| 2005/0283364 A1* | 12/2005 | Longe et al. | 704/257 |
| 2005/0283532 A1* | 12/2005 | Kim et al. | 709/225 |
| 2005/0288934 A1* | 12/2005 | Omi | 704/270 |
| 2006/0020462 A1* | 1/2006 | Reich | G10L 15/187 |
| | | | 704/254 |
| 2006/0036770 A1* | 2/2006 | Hosn et al. | 709/248 |
| 2006/0290709 A1* | 12/2006 | Omi et al. | 345/594 |
| 2007/0005990 A1* | 1/2007 | Sathish | H04L 67/14 |
| | | | 713/189 |
| 2007/0157216 A1* | 7/2007 | Maes | 719/320 |
| 2007/0226635 A1* | 9/2007 | Goebel | G06F 17/30905 |
| | | | 715/745 |
| 2008/0065715 A1* | 3/2008 | Hsu et al. | 709/203 |
| 2008/0120358 A1* | 5/2008 | Yano et al. | 709/201 |
| 2008/0133228 A1* | 6/2008 | Rao | 704/231 |
| 2008/0154604 A1* | 6/2008 | Sathish et al. | 704/257 |
| 2008/0162471 A1* | 7/2008 | Bernard | 707/5 |
| 2008/0221879 A1* | 9/2008 | Cerra et al. | 704/235 |
| 2008/0221880 A1* | 9/2008 | Cerra et al. | 704/235 |
| 2008/0221884 A1* | 9/2008 | Cerra et al. | 704/243 |
| 2008/0221889 A1* | 9/2008 | Cerra et al. | 704/251 |
| 2008/0221897 A1* | 9/2008 | Cerra et al. | 704/270.1 |
| 2008/0221898 A1* | 9/2008 | Cerra et al. | 704/270.1 |
| 2008/0221899 A1* | 9/2008 | Cerra et al. | 704/270.1 |
| 2008/0221900 A1* | 9/2008 | Cerra et al. | 704/270.1 |
| 2008/0221901 A1* | 9/2008 | Cerra et al. | 704/270.1 |
| 2008/0221902 A1* | 9/2008 | Cerra et al. | 704/270.1 |
| 2008/0228496 A1* | 9/2008 | Yu et al. | 704/275 |
| 2008/0243777 A1* | 10/2008 | Stewart et al. | 707/3 |
| 2008/0249782 A1* | 10/2008 | Ativanichayaphong | H04L 29/08072 |
| | | | 704/275 |
| 2009/0013035 A1* | 1/2009 | Hosn et al. | 709/203 |
| 2009/0077493 A1* | 3/2009 | Hempel et al. | 715/810 |
| 2009/0164207 A1* | 6/2009 | Makela et al. | 704/9 |
| 2009/0171659 A1* | 7/2009 | Pearce | G10L 15/24 |
| | | | 704/235 |
| 2009/0182561 A1* | 7/2009 | Huang | G10L 15/19 |
| | | | 704/250 |
| 2009/0183070 A1 | 7/2009 | Robbins | |
| 2009/0281789 A1* | 11/2009 | Waibel et al. | 704/3 |
| 2009/0313021 A1* | 12/2009 | Carminati et al. | 704/260 |
| 2010/0049520 A1* | 2/2010 | Stewart et al. | 704/257 |
| 2010/0205268 A1* | 8/2010 | Zhu et al. | 709/206 |
| 2011/0010174 A1* | 1/2011 | Longe et al. | 704/235 |
| 2011/0307241 A1* | 12/2011 | Waibel et al. | 704/2 |

OTHER PUBLICATIONS

Gargan Jr, Robert A., Joseph W. Sullivan, and Sherman W. Tyler. "Multimodal response planning: an adaptive rule based approach." Proceedings of the SIGCHI conference on Human factors in computing systems. ACM, 1988.*

Portillo, Pilar Manchon, Guillermo Perez Garcfa, and Gabriel Amores Carredano. "Multimodal fusion: a new hybrid strategy for dialogue systems."Proceedings of the 8th international Conference on Multimodal interfaces. ACM, 2006.*

G. Cook and T. Robinson, "Boosting the performance of connectionist large vocabulary speech recognition," Proceeding of Fourth International Conference on Spoken Language Processing. ICSLP '96, 1996, pp. 1305-1308 vol. 3, doi: 10.1109/ICSLP.1996.607852. (Year: 1996).*

Chin Kim On, Paulraj M. Pandiyan, Sazali Yaacob, Azali Saudi, "Mel-Frequency Cepstral Coefficient Analysis in Speech Recognition," IEEE, ICOCI 2006, https://ieeexplore.ieee.org/stamp/stamp.jsp?tp=&arnumber=5276486 (accessed Jan. 5, 2022). ("On") (page number refers to page of unpaginated pdf).*

* cited by examiner

FIG. 2A  Audio Output

_US 11,487,347 B1_

ENHANCED MULTI-MODAL COMMUNICATION

PRIORITY CLAIM

This application claims priority to U.S. provisional application Ser. No. 61/112,937, filed Nov. 10, 2008, which is hereby incorporated by reference in its entirety.

BACKGROUND

The use of personal computers and other processor-based communication devices to conduct transactions electronically continues to increase, as does the reliability and sophistication of the underlying communication networks. Brick-and-mortar institutions that were once the exclusive province of many goods and services have been augmented or replaced by online or telephone-based counterparts that offer the same goods and services more conveniently and efficiently and, oftentimes, less expensively. Electronic interactions with these entities are conducted using a user interface presented via the communication device. In the online context, the user interface typically comprises a web page displayed on a screen of the communication device and includes fields for displaying information entered by a user (e.g., text, files, screen selections, etc.) and information downloaded to the communication device. In the telephone context, the user interface may comprise an interactive voice response (IVR) menu that allows a user to choose between various menu selections.

Despite their widespread use, such interfaces are typically limited to a small number of communication modalities. For example, web page interfaces for interacting with online retailers and other service providers are typically limited to a mechanical motion input modality (e.g., using a keyboard, a mouse, a scroll wheel, touch screen, etc.) and a visual output modality (e.g., a screen), while IVR interfaces for conducting analogous interactions in the telephone context are relegated to audio input and output modalities (e.g., using a microphone, a speaker, DTMF tones). Unfortunately, the communication modalities available to a user of a particular interface may not be the most optimal. For example, in the case of an airline reservation web page interface, a user must typically select four different drop-down menus to indicate the city, date and time of departure, and the city of arrival, respectively. Similarly, in the case of an IVR interface, the seriatim presentation of long lists of selectable options (e.g., lists of available flights) is time-consuming and tedious for the user.

SUMMARY

In one general aspect, the present invention is directed to computer-based systems and methods for multi-modal communication. In one embodiment, the system comprises an application server comprising an application accessible to a user via at least one network, at least one electronic communication device in communication with the application via the at least one network to define a user interface of the at least one electronic communication device, where the at least one electronic communication device comprises two or more input devices to interact with the application using a corresponding two or more input modalities simultaneously, where the two or more input modalities comprise an audio-input modality.

In one embodiment, the method comprises electrically connecting, via at least one network, at least one electronic communication device and an application server, where the application server comprises an application accessible to the at least one electronic communication device via at least one network, receiving from a user of the at least on electrical communication device via the at least one network an audio-input modality input to the application server during an application session; and receiving from the user of the at least on electrical communication device via the at least one network a mechanical motion-input modality input to the application server during the application session.

FIGURES

Various embodiments are described herein by way of example in conjunction with the following figures, wherein:

FIGS. 2A and 2B illustrate components of a voice server according to various embodiments;

DESCRIPTION

Figure 1:
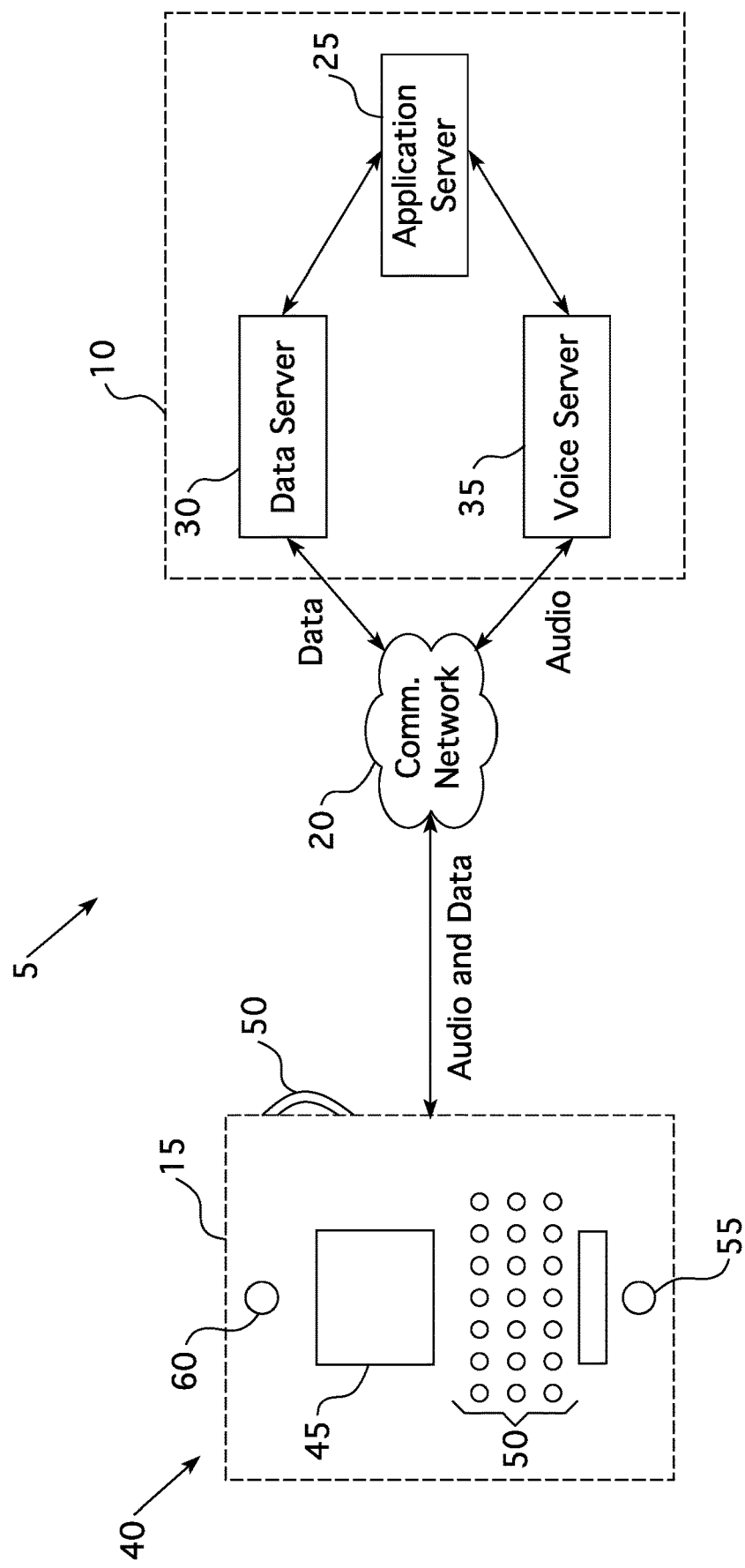
FIG. 1 illustrates a system for providing a user interface to enable the exchange of information using multiple modalities according to one embodiment.

FIG. 1 illustrates a system 5 for providing a user interface to enable the exchange of information using multiple modalities according to one embodiment. As shown, the system 5 includes a host computer system 10 in communication with an electronic communication client device 15 via a communication network 20. The host computer system 10 may include an application server 25, a data server 30, and a voice server 35, with the application server 25 including parallel connections to the communication network 20 via the data server 30 and the voice server 35, respectively. The application server 25 may be in electrical communication with the data server 30 and the voice server 35 through any suitable communication technique, such as a network connection, an internal bus, or an external bus, for example. The application server 25 may host one or more applications with which a user of the client device 15 may interact using a user interface 40 presented via the client device 15. The one or more applications may generally include any computer application configured to perform a service requested by a user of the client device 15. Such services may include, for example, financial services (e.g., services associated with the purchase or sale of goods and services, banking or investment services), as well as non-financial services involving, for example, only the exchange of informational content between the client device 15 and the host computer system 10 and/or one or more computers or other devices external to the host computer system 10. The application server may communicate with one or more databases (not shown) containing data associated with the hosted applications. Although the servers 25, 30, 35 are shown as separate elements in FIG. 1, it will be appreciated that in other embodiments at least two of the servers 25, 30, 35 may be contained within a single device.

According to various embodiments, the client device 15 may be a processor-based and network-enabled device configured to provide telephone and data services via the communication network 20 using a wired and/or wireless connection. In certain embodiments, for example, the client device 15 may be any electronic communication device employing third generation (3G) mobile telephone technologies based on the International Mobile Telecommunications-2000 (IMT-2000) standard. Examples of 3G communication devices include, without limitation, the iPhone 3G available from Apple Computer Inc., of Cupertino, Calif., and the BlackBerry Bold 9000 available from Research In Motion Limited, of Ontario, Calif. The client device 15 may include a screen 45 to display visual components of the interface 40 and a number of input devices 50 (e.g., a QWERTY keyboard, scroll wheel, touch screen, trackball, etc.) for enabling a user to interact with the user interface 40 via visual output and mechanical motion input modalities. The client device 15 may further include a microphone 55 and a speaker 60 to enable interaction with the interface 40 using audio input and output modalities while simultaneously using other input and output modalities, as discussed in further detail below.

According to various embodiments, the communication network 20 may comprise any network configured to provide simultaneous voice and data connections between the client device 15 and the host computer system 10. In certain embodiments, for example, the communication network 20 may comprise a 3G network utilizing High Speed Downlink Packet Access/Universal Mobile Telephone System (HSDPA/UMTS) mobile communication technologies.

According to various embodiments, the user interface 40 may be presented by the application server 25 via the client device 15 and be configured to receive and output information using multiple modalities, either alone or in combination. In certain embodiments, for example, information may be input into the user interface 40 using mechanical motion and audio input modalities simultaneously or separately. Similarly, information may be output from the user interface 40 using, for example, visual and audio output modalities simultaneously or separately. For such embodiments, it will be appreciated that information being transmitted over the communication network 20 in connection with a particular interface may, at any given time, include either or both of audio information (e.g., voice information) and data (e.g., non-voice information). Data may be routed to and from the application server 25 via the data server 30, and audio information may be routed to and from the application server 25 via the voice server 35.

The data server 30 generally functions to link the application server 25 to the screen 45 of the client device 15 and to process data exchanged between the communication network 20 and the application server 25. Such processing may include, for example, converting data received from the client device 15 via the communication network 20 (e.g., user interface selections entered using a keyboard or touch screen) into a format compatible with the application server 25, and converting data to be transmitted from the application server 25 to the client device 15 (e.g., user interface options, images) into a format compatible with the communication network 20.

Figure 2B:
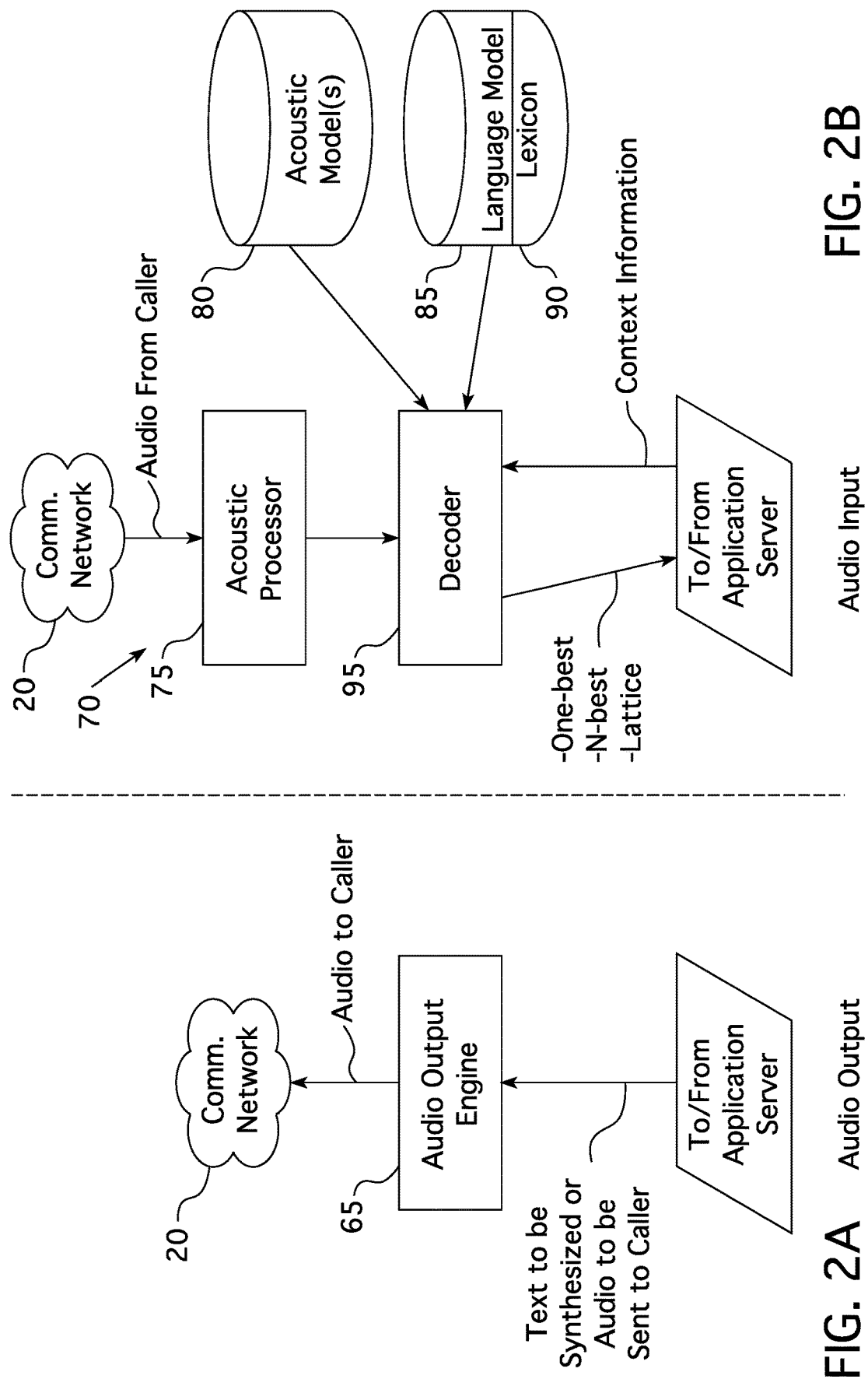

FIGS. 2A and 2B illustrate components of the voice server 35 according to various embodiments. The general function of the voice server 35 is to process audio information exchanged between the communication network 20 and the application server 25. As shown in FIG. 2A, the voice server 35 may comprise an audio output component in the form of an audio output engine 65 for converting information received from the application server 25 into an audio-based format suitable for transmission to the client device 15 via the communication network 20. In certain embodiments, the audio output engine 65 may comprise a text-to-speech engine for dynamically generating suitably formatted human speech based on text content received from the application server 25. Additionally or alternatively, the audio output engine 65 may be configured convert a pre-recorded audio file received from application server 25 into a format transmittable via the communication network 20. Generally, the various engines described herein may be comprised of software applications and/or hardware components, such as processors and memory, for example.

In certain embodiments and as shown in FIG. 2B, the voice server 35 may include an audio input component 70 for converting audio information received from the communication network 20 into a format suitable for use by the application server 25. As shown, the audio input component 70 may comprise an acoustic processor 75, one or more acoustic models 80, a language model 85, a lexicon 90, and a decoder 95. In certain embodiments, the decoder 95 may comprise a speech-to-text engine. Audio information received from the communication network 20 is processed by the acoustic processor 75 to generate an acoustic representation of the audio information. The decoder 95 next compares the acoustic representation to acoustic model(s) 80 and decodes the audio content using the language model 85 and the lexicon 90. The output of the decoder 95 may be communicated to the application server 25 in the form of, for example, a single-best decoded string. Alternatively, the decoder 95 output may be formatted as a list of N-best choices, or as an entire lattice structure representing the entire "search space" of the decoded audio content. More details regarding such speech recognition systems may be found in the following references, which are incorporated herein in their entirety: U.S. Pub. No. 2002/0165715 A1; U.S. Pat. Nos. 6,973,427; and 7,050,550

In certain embodiments, the application server 25 may communicate with the decoder 95 to, for example, set various decoder parameters and/or to make changes to the language model 85 and the lexicon 90 prior to decoding audio content. In embodiments in which the decoder 95 comprises a speech-to-text engine, for example, the language model 85 and/or the lexicon 90 may be altered based on data that has been transmitted to the client device 15. For example, if data has been sent to the client device 15 in order to visually present five options via the user interface 40 that are selectable via an audio input modality, the lexicon 90 of the speech-to-text engine may automatically be limited and the language model 85 altered such that identification of one of the five options is favored by the speech-to-text engine. In this way, the ability of a user to accurately select, by voice, one of the five options may be significantly enhanced.

Figure 3:
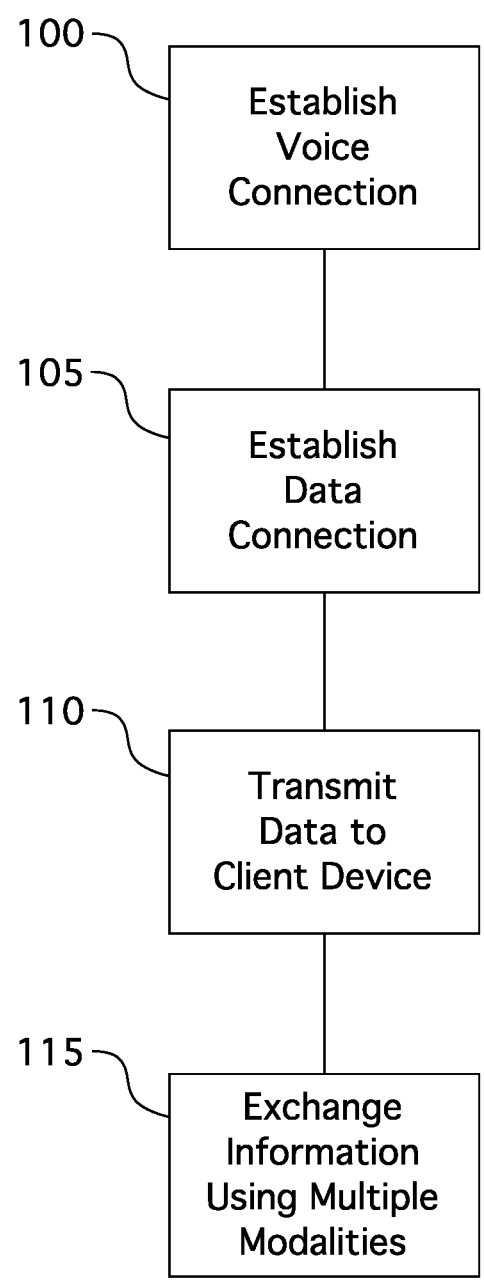
FIG. 3 is a flowchart illustrating a process for establishing multi-modal communication according to one embodiment.

FIG. 3 is a flowchart illustrating a process for establishing multi-modal communication between the client device 15 and the application server 25 according to one embodiment. At block 100, a voice connection between the client device 15 and the application server 25 is established by a user of the client device 15 via the communication network 20 and the voice server 35. A user may establish the voice connection by dialing a pre-determined telephone number associated with the application server 25 or a particular application hosted thereon. In certain embodiments, after a voice connection has been established, the application server 25 may cause a voice message to be transmitted to the client device 15 that confirms the existence of a successful voice connection.

At block 105, a data connection between the application server 25 and the client device 15 is established by the application server 25 via the data server 30 and the communication network 20. In certain embodiments, the identity of the client device 15 with which the data connection is to be made is determined based on the phone number of the client device 15 as detected by the application server 25. In other embodiments, the data connection may be established based on a password or other identifier spoken by a user of the client device 15 or input by the user using DTMF tones.

In certain embodiments, the data connection may be established by the user via the client device 15 instead. In one embodiment, for example, after the voice connection is established, a password may be provided to the user (e.g., spoken to the user, emailed to the user) that may be subsequently used to access the visual component of the user interface 40 via a web site, for example.

In certain embodiments, and as further discussed below in connection with the system 115 of FIG. 4, the data connection may be established with a client device different from the client device 15 from which the voice connection is originated. In one embodiment, for example, a data connection may be established with a second client device connected to the communication network 20 (e.g., the Internet). In another embodiment, a data connection may be established with a second client device in communication with application server 30 via a communication network other than the communication network 20. In such embodiments, the modalities for interacting with the interface 40 will thus be split across different client devices, with the audio input and output modalities associated with the client device 15, and the visual and mechanical motion input and output modalities associated with the second client device.

After the data connection is established, the application server 25 may transmit data to the appropriate client device (e.g., client device 15) at block 110 to establish the user interface 40. In certain embodiments, the application server 25 may include a web server application for exchanging information with the client device 15 using HTTP. In such embodiments, data transmitted to the client device 15 may include, for example, static and/or dynamic HTML documents that are processed and displayed by a suitable client browser (e.g., Internet Explorer Mobile, Blazer) of the client device 15 to define and display visual components of the user interface 40. The interface content provided by the application server 25 may be stored within the application server 25 or elsewhere within the host computer system 10. Alternatively, some or all of the interface content may be retrieved by the application server 25 from a server or other device external to the host computer system 25 via a second communication network, such as the Internet for example. In embodiments in which the application server 25 hosts more than one application, the user interface 40 may be initially configured such that one or more of the applications may be selectively invoked by the user.

At block 115, the user interface 40 may exchange information with the corresponding application of the application server 25 responsive to information supplied by a user of the client device 15. Advantageously, by virtue of the voice and data connections established at blocks 100 and 105, respectively, communication modalities available for facilitating the exchange of information are significantly expanded. In this way, the user interface 40 may be designed such that different types of information to be exchanged may be optimally matched with a communication modality. For example, in the case of an airline reservation webpage interface of an e-ticketing application hosted by the application server 25, a user may be presented with four drop-down menus from which the city, date and time of departure, and the city of arrival, are to be respectively selected. In such cases, instead of requiring the user to make a separate selection from each drop-down menu using a mechanical motion input device (e.g., a keyboard or a touch screen), the user may instead speak the desired information, e.g., "I would like to fly from Spokane to Seattle next Tuesday morning." This audio information may then be transmitted to the voice server 35 to be converted into a format suitable for use by the application server 25 (e.g., a text format). The e-ticketing application may subsequently update the airline reservation webpage interface with the converted information.

Although the above example illustrates a particular use of the audio input modality for selecting information from drop-down boxes, it will be appreciated that any interaction with a user interface that may be tedious or otherwise sub-optimal when using mechanical motion input modalities may be performed using the audio input modality. Such interactions may include, for example, filling in certain types of form data, scrolling between pages, or navigating between different screens. It will further be appreciated that in certain embodiments the interface screen 40 may support combinations of input modalities. For example, referring again to the airline reservation webpage interface discussed above by way of example, certain information to be input by the user (e.g., credit card information) may be more amenable to mechanical motion input modalities. Accordingly, both mechanical motion and audio input modalities may be used to interact with the user interface 40.

Similarly, the user interface 40 may be configured to employ an audio output modality for exchanged information that cannot be optimally presented using a visual output modality. Such information may include, for example, important notices or other critical information that might otherwise be inconspicuous when presented in a visual medium. Additionally, an audio output modality may be used to generally simplify usability of the user interface 40. In certain embodiments, for example, selecting a hypertext link (e.g., a financial transaction on an electronic billing statement) that might otherwise cause a pop-up screen to appear may instead cause the voice server 35 to convert the text content of the pop-up screen into voice information. Similarly, less significant information that might otherwise be displayed with associated information of greater importance (therefore potentially decreasing readability of the user interface 40) may instead be presented as voice information upon selection of the displayed information.

Moreover, in embodiments where the communication network 20 is configured to support simultaneous transmission of data and voice information (e.g., a 3G network utilizing HSDPA/UMTS mobile communication technologies), communication modalities may be used concurrently. For example, referring again to the airline reservation webpage interface discussed above, a user may interact with the interface using mechanical motion input modalities (e.g., a keyboard and/or touch screen) to enter billing information, while at the same time speaking to the interface to present information regarding departure and arrival locations and flight times.

The user interface 40 may similarly employ output modalities simultaneously to present information to the user. For example, in order to confirm a user's travel arrangements, the airline reservation webpage interface may display the flight information and provide a brief spoken synopsis of important items of information (e.g., departure date and time, cost, etc.). At the same time, the interface may highlight each item of information as it is discussed to draw the user's attention to the correct information.

In certain embodiments, in addition to or as an alternative to the voice server 35, the system 5 may comprise a human agent for responding to inputs provided by the interface user. In one embodiment, for example, in cases where the voice server 35 might otherwise present a large amount of audio information better suited for display, the human agent may instead cause the information to be visually displayed via the interface 40.

Figure 4:
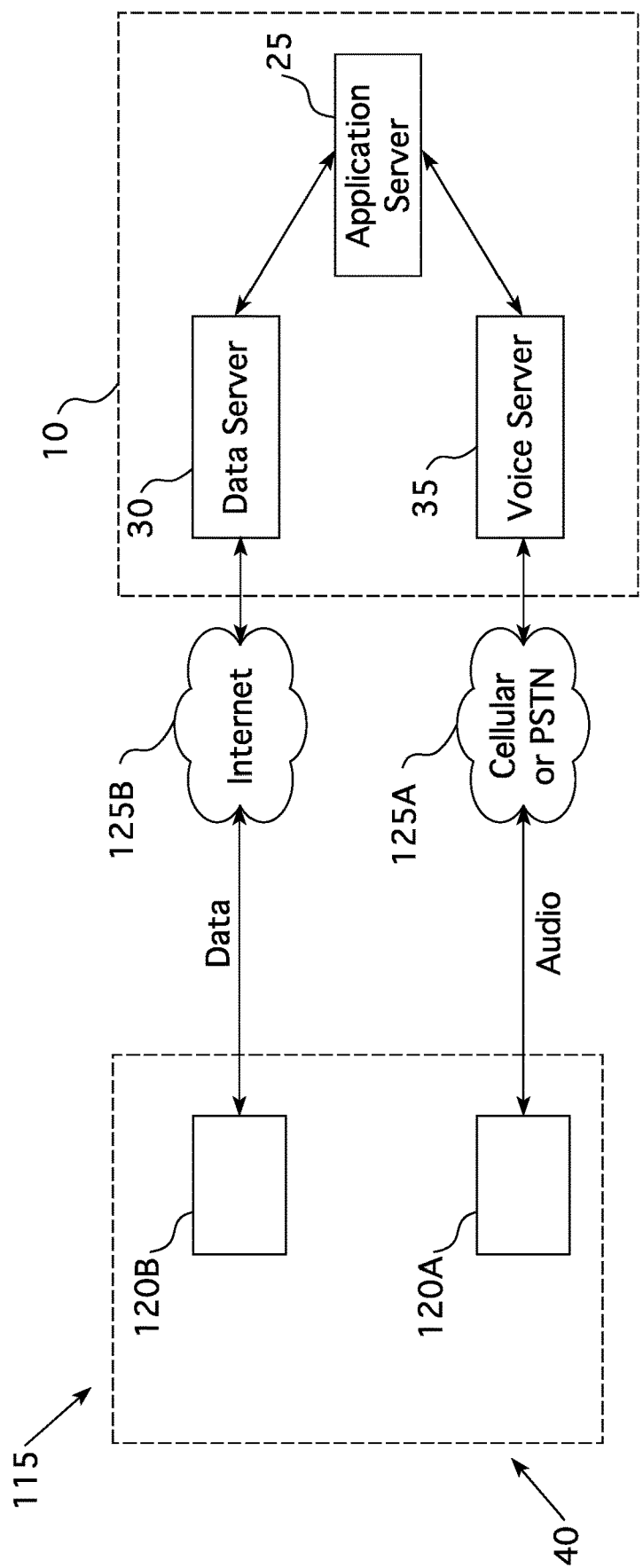
FIG. 4 illustrates a system for providing a user interface to enable the exchange of information using multiple modalities according to one embodiment.

FIG. 4 illustrates a system 115 for providing a user interface 40 to enable the exchange of information using multiple modalities according to another embodiment. Unlike the system 5 shown in FIG. 1, the system 115 comprises a first client device 120A and a second client device 120B for presenting the user interface 40. Each client device 120A-B may communicate with the host computer system 10 via corresponding communication networks 125A-B, respectively. As shown, the first device 120A and the first network 125A may operate to provide an audio connection with the application server 25 via the voice server 35, and the second device 120A and the second network 125B may operate to provide a data connection with the application server 25 via the data server 30. Accordingly, the communication modalities for interacting with the interface 40 are split across different client devices and networks, with the audio-based modalities associated with first client device 120A and the first network 125A, and with the visual and mechanical motion input and output modalities associated with the second client device 120B and the second network 125B. Accordingly, neither of the client devices 120A-B or their corresponding networks 125A-B needs to provide both telephone and data communication capabilities. In this way, the client devices 120A-B and the networks 125A-B may be implemented using conventional telephone and data communication devices and technologies.

In one embodiment, for example, the first client device 120A may comprise a conventional wireless or wireline telephone, and the first network 125A may comprise one or more types of conventional telephone communication networks (e.g., cellular and/or PSTN telephone networks). Similarly, the second client device 120B may comprise a conventional network-enabled computing device capable of receiving and processing data (e.g., a desktop computer, a laptop computer, a pocket computer, a browser-equipped mobile phone), and the second network 125B may comprise any suitable network for transmitting data (e.g., the Internet). In certain embodiments, the process for establishing multi-modal communication between the client devices 120A-B and the application server 25 may similar or identical to that described in connection with FIG. 3 above.

According to various embodiments, the system generally comprises an application server comprising an application accessible to a user via at least one network, at least one electronic communication device in communication with the application via the at least one network to define a user interface, where the at least one electronic communication device comprises two or more input devices to interact with the application using a corresponding two or more input modalities simultaneously, where the two or more input modalities comprise an audio-input modality.

In one embodiment, the two or more input modalities comprise a mechanical input modality. In one embodiment, the system further comprises a voice server in electrical communication with the at least one network and the application server. In one embodiment, the voice server comprises an audio output engine configured to convert information received from the application server into an audio-based format suitable for transmission to the at least one electronic communication device via the at least one network. In one embodiment, the audio output engine comprises a text-to-speech engine configured to dynamically generate human speech based on text content received from the application server. In one embodiment, the voice server comprises an audio input component configured to convert audio information received from the at least one network into a format suitable for use by the application server. In one embodiment, the audio input component comprises an acoustic processor, an acoustic model, a language model, a lexicon, and a decoder. In one embodiment, the system comprises a data server in electrical communication with the at least one network and the application server. In one embodiment, the data server is configured to convert data received from the at least one electronic communication device via at least one network into a format suitable for use by the application server. In one embodiment, the data server is configured to convert data to be transmitted from the application server to the at least one electronic communication device into a format suitable for use by the at least one network.

In one embodiment, the system further comprises a voice server in communication with the at least one network and the application server, where the voice server comprises an audio output engine that converts information received from the application server into an audio-based format suitable for transmission to the at least one electrical communication device via the at least one network, where the voice server comprises an audio input component that converts audio information received from the at least one network into a format suitable for use by the application server, and a data server in communication with the at least one network and the application server, where the data server converts data received from the at least one electrical communication device via at least one network into a format suitable for use by the application server, and where the data server converts data to be transmitted from the application server to the at least one electrical communication device into a format suitable for use by the at least one network.

According to various embodiments, the system generally comprises a data server accessible to a first user device via a first network, a voice server accessible to a second user device via a second network, an application server comprising an application, where the application server is in electrical communication with the data server and the voice server, where the application is accessible to the first user via the first network via a mechanical motion-input modality, where the application is accessible to the second user device via the second network to via an audio-input modality.

In one embodiment, the first network is the second network. In one embodiment, the first user device is a network-enabled computing device and the second user device is a telephone. In one embodiment, the first network is a data network and the second network is a voice network. In one embodiment, the data server is configured to convert data received from the first device via the first network into a format suitable for use by the application server. In one embodiment, the data server is configured to convert data to be transmitted from the application server to the first device into a format suitable for use by the first network. In one embodiment, the voice server comprises an audio input component configured to convert audio information received from the second device via second network into a format suitable for use by the application server. In one embodiment, the voice server comprises ah audio output engine configured to convert information received from the application server into an audio-based format suitable for transmission to the second device via the second network.

According to various embodiments, the method generally comprises electrically connecting, via at least one network, at least one electronic communication device and an application server, where the application server comprises an application accessible to the at least one electronic communication device via at least one network, and receiving from a user of the at least on electrical communication device via the at least one network an audio-input modality input to the application server during an application session, and receiving from the user of the at least on electrical communication device via the at least one network a mechanical motion-input modality input to the application server during the application session.

According to various embodiments, the system comprises an application server comprising an application accessible to a user via at least one network, at least one electronic communication device in communication with the application via the at least one network to define a user interface, where the at least one electronic communication device comprises two or more input devices to interact with the application using a corresponding two or more input modalities simultaneously, where the two or more input modalities comprise an audio-input modality.

According to one embodiment, the two or more input modalities comprise a mechanical motion input modality. According to one embodiment, the system comprises a voice server in communication with the at least one network and the application server. According to one embodiment, the voice server comprises an audio output engine that converts information received from the application server into an audio-based format suitable for transmission to the at least one electronic communication device via the at least one network. According to one embodiment, the audio output engine comprises a text-to-speech engine that dynamically generates human speech based on text content received from the application server. According to one embodiment, the voice server comprises an audio input component that converts audio information received from the at least one network into a format suitable for use by the application server. According to one embodiment, the audio input component comprises an acoustic processor, an acoustic model, a language model, a lexicon, and a decoder. According to one embodiment, the system further comprises a data server in communication with the at least one network and the application server. According to one embodiment, the data server converts data received from the at least one electronic communication device via at least one network into a format suitable for use by the application server. According to one embodiment, the data server converts data to be transmitted from the application server to the at least one electronic communication device into a format suitable for use by the at least one network.

According to various embodiments, the system comprises a data server accessible to a first user device via a first network, a voice server accessible to a second user device via a second network, an application server comprising an application, wherein the application server is in communication with the data server and the voice server, wherein the application is accessible to the first user device via the first network via a mechanical motion-input modality, wherein the application is accessible to the second user device via the second network to via an audio-input modality.

According to one embodiment, the first network is the second network. According to one embodiment, the first user device is a network-enabled computing device and the second user device is a telephone. According to one embodiment, the first network is a data network and the second network is a voice network. According to one embodiment, the data server converts data received from the first device via the first network into a format suitable for use by the application server. According to one embodiment, the data server converts data to be transmitted from the application server to the first device into a format suitable for use by the first network. According to one embodiment, the voice server comprises an audio input component that converts audio information received from the second device via second network into a format suitable for use by the application server. According to one embodiment, the voice server comprises an audio output engine that converts information received from the application server into an audio-based format suitable for transmission to the second device via the second network.

According to various embodiments, the method comprises electrically connecting, via at least one network, at least one electronic communication device and an application server, where the application server comprises an application accessible to the at least one electronic communication device via at least one network and facilitating interaction between the application and the at least one electronic communication device via the at least one network using two or more input modalities simultaneously, where the two or more input modalities comprises an audio-input modality and a mechanical motion-input modality. According to one embodiment, the at least one electronic communication device comprises a network-enabled computing device and a telephone.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers, or other processor-based devices. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language or platform such as .NET, SQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, to transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN), metropolitan area network (MAN), wide area network (WAN), virtual private network (VPN), storage area network (SAN), or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/ or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A system comprising:
a client device having a microphone to receive voice input, the client device having multiple modalities to convey output, the client device being configured to transmit the voice input over a wireless network; and
a host computer system configured to receive the voice input transmitted over the wireless network, the host computer system comprising:
a voice server to process the voice input using a language model and lexicon, the voice server generating a result, wherein the voice server comprises an audio input component comprising a speech-to-text engine configured to generate an acoustic representation of the voice input, compare the acoustic representation to an acoustic model to generate audio content, and decode the audio content using the language model and the lexicon to generate the result comprising decoded audio content;
an application server to receive the result from the voice server and to perform an operation using the result, the application server determining a response based at least in part on context determined as part of a conversation; and
a data server to receive the response from the application server and to transmit the response to the client device;
the client device configured to convey the response via at least a first modality and a second modality of the multiple modalities, the first modality and the second modality based on a type of information contained in the response and a clarity context of the response, the client device configured to convey a first portion of the response via the first modality and a second portion of the response via the second modality, the first portion and the second portion being different types of information, the first modality not able to communicate the second portion, and the second modality not able to communicate the first portion, wherein the first modality is an audio output modality and the second modality is a visual output modality.

2. The system of claim 1 wherein the response comprises at least one of text or a graphic.

3. The system of claim 1 wherein the application server provides context information to the voice server for use in processing the voice input.

4. A server system comprising:
a voice server to process voice information received from a remote device, the voice server using a language model to process the voice information and generate a result, wherein the voice server comprises an audio input component comprising a speech-to-text engine configured to generate an acoustic representation of the voice information, compare the acoustic representation to an acoustic model to generate audio content, and decode the audio content using the language model and a lexicon to generate the result comprising decoded audio content;
an application server to provide context information to the voice server for use in processing the voice information, the application server further to perform an operation using the result generated by the voice server and produce a response from the operation, the application server further to determine, based on content of the response and clarity factor of the response, two or more modalities from multiple modalities in which to convey the response to a user; and
a data server to receive the response from the application server and to transmit the response to the remote device, wherein the response is conveyed to the user using the determined two or more modalities, a first modality of the two or more modalities conveying a first portion of the response, a second modality of the two or more modalities conveying a second portion of the response, wherein the first portion is a different type of information than the second portion, the first modality not effective in conveying the second portion, the second modality not effective in conveying the first portion, and wherein the first modality is an audio output modality and the second modality is a visual output modality.

5. The server system of claim 4, wherein the multiple modalities comprise an audio-based modality and a mechanical-based modality.

6. The server system of claim 4, wherein the voice server comprises an audio input component that converts the voice information into a format suitable for use by the application server.

7. A method comprising:
receiving, at a client device, a multi-modal simultaneous input comprising a voice input comprising a first intent and a disparate non-voice input comprising a second intent, the first intent and second intent being disparate;
transmitting the multi-modal simultaneous input from the client device to a remote host server system, wherein the voice input is decoded using a speech-to-text engine configured to generate an acoustic representation of the voice input, compare the acoustic representation to an acoustic model to generate audio content, and decode the audio content using a language model and a lexicon to generate an application input representative of the voice input and comprising decoded audio content;
receiving, at the client device, an application response from the remote host server system, the application response based at least in part on the application input, the application response generated based at least in part on a context comprising the disparate non-voice input the application response conveyable using multiple modalities;
matching, based at least in part on content of the application response, the application response with a first modality and a second modality of the multiple modalities, the first modality and the second modality based on a type of information contained in the application response and a clarity context of the application response, the client device configured to convey a first portion of the application response via the first modality and a second portion of the application response via the second modality, the first portion and second portion being different types of information, the first modality not able to communicate the second portion, and the second modality not able to communicate the first portion, wherein the first modality is an audio output modality and the second modality is a visual output modality; and
outputting, on the client device, the application response to the user using the matched modalities.

8. The method of claim 7 further comprising receiving mechanical input at the client device to interact with the application response.

9. The method of claim 7 further comprising receiving a second voice input at the client device to interact with the application response.

10. The method of claim 7 wherein transmitting the multi-modal simultaneous input comprises transmitting the voice input, via a first network, to a remote host server system that decodes the voice input using context information and transmitting a non-voice input of the multi-modal simultaneous input, via second network, to the remote host server system.

11. A method comprising:
receiving, at a client device, a voice input;
transmitting the voice input to a remote host server system, where the voice input is decoded using a speech-to-text engine configured to generate an acoustic representation of the voice input, compare the acoustic representation to an acoustic model to generate audio content, and decode the audio content using a language model and a lexicon to generate an application input representative of the voice input and comprising decoded audio content;
receiving, at the client device, the response from the remote host server system, the response based at least in part on the application input; and
conveying the response via two or more modalities of the client device, the two or more modalities matched from multiple modalities in which to convey the response, the matching being based on a type of information contained in the response and a clarity of the response consideration, a first modality of the two or more modalities conveying a first portion of the response, a second modality of the two or more modalities conveying a second portion of the response, wherein the first portion is a different type of information than the second portion, the first modality not capable of conveying the second portion, the second modality not effective in conveying the first portion, and wherein the first modality is an audio output modality and the second modality is a visual output modality.

12. The method of claim 11 further comprising receiving mechanical input at the client device to interact with the response.

13. The method of claim 11 further comprising receiving a second voice input at the client device to interact with the response.

14. The method of claim 11 wherein transmitting the voice input comprises transmitting the voice input to a remote host server system that decodes the voice input using context information.

15. A method, comprising:
receiving, at a server system, user input of a user communicated from an electrical communication device;
decoding, at the server system, the user input using a speech-to-text engine configured to generate an acoustic representation of the user input, compare the acoustic representation to an acoustic model to generate audio content, and decode the audio content using a language model and a lexicon;
generating, at the server system, a response to the user input; and
matching two or more modalities from multiple modalities in which to convey the response to the user via the electrical communication device, the matching being based on a type of information contained in the response and a simplification consideration of the response, a first modality of the two or more modalities conveying a first portion of the response, a second modality of the two or more modalities conveying a second portion of the response, wherein the first portion is a different type of information than the second portion, the first modality incapable of conveying the second portion, the second modality incapable of conveying the first portion, and wherein the first modality is an audio output modality and the second modality is a visual output modality.

16. The method of claim 15 further comprising transmitting the response to the electrical communication device to be conveyed to the user via the matched modality.

17. The method of claim 15 further comprising matching at least two modalities to convey the response to the user, and transmitting the response to the electrical communication device to be conveyed to the user via the at least two matched modalities.

18. One or more computer-readable non-transitory storage media storing computer-executable instructions that, when executed, configure a processor to perform acts comprising:

receiving a conversation-based input of a user captured via a remote device, processing the conversation-based input using a speech-to-text engine configured to generate an acoustic representation of the conversation-based input, compare the acoustic representation to an acoustic model to generate audio content, and decode the audio content using a language model and a lexicon to generate a result comprising decoded audio content, the conversation-based input comprising two or more simultaneous disparate inputs in two or more input modalities, the simultaneous disparate inputs comprising two or more disparate intents;

performing an operation using the result to produce a response, the response based at least in part on context information and the two or more simultaneous disparate inputs, the context information comprising modalities of the simultaneous disparate inputs;

matching, based at least in part on content of the response, the response with a first modality and a second modality, the first modality and the second modality based on a type of information contained in the response and a clarity context of the response, the remote device configured to convey a first portion of the response via the first modality and a second portion of the response via the second modality, the first portion and second portion being different types of information, the first modality not able to communicate the second portion and the second modality not able to communicate the first portion, wherein the first modality is an audio output modality and the second modality is a visual output modality; and providing the response and the matched modalities for transmission to the remote device.

19. The one or more computer-readable non-transitory storage media of claim 18, further storing computer-executable instructions that, when executed, further configure the processor to perform acts comprising:

selecting, based at least in part on content of the response, a modality from multiple modalities in which to convey the response to the user;

wherein the providing the response further comprises conveying the response in the selected modality; and wherein the multiple modalities comprise an audio-based modality and a mechanical-based modality.

20. The one or more computer-readable non-transitory storage media of claim 18, further storing computer-executable instructions that, when executed, further configure the processor to perform acts comprising:

selecting, based at least in part on content of the response, a modality from multiple modalities in which to convey the response to the user;

wherein the providing the response further comprises conveying the response in the selected modality; and choosing another modality from the multiple modalities and providing the response such that the response is conveyed to the user via a combination of two modalities.

21. The one or more computer-readable non-transitory storage media of claim 18, further storing computer-executable instructions that, when executed, further configure the processor to perform acts comprising:

selecting, based at least in part on content of the response, a modality from multiple modalities in which to convey the response to the user;

wherein the providing the response further comprises conveying the response in the selected modality; and choosing another modality from the multiple modalities and providing the response such that the response is conveyed to the user via two modalities simultaneously.

22. The one or more computer-readable non-transitory storage media of claim 18, further storing computer-executable instructions that, when executed, further configure the processor to perform acts comprising:

selecting, based at least in part on content of the response, a modality from multiple modalities in which to convey the response to the user;

wherein the providing the response further comprises conveying the response in the selected modality; and enabling a user interface on the remote device to receive a next input from the user via another modality from the multiple modalities that is different than the modality used to convey the response to the user.

* * * * *